United States Patent

Enloe et al.

[15] 3,644,665
[45] Feb. 22, 1972

[54] HOLOGRAPHIC FLYING-SPOT SCANNER

[72] Inventors: Louis H. Enloe; Arthur B. Larsen, both of Colts Neck, N.J.

[73] Assignee: Bell Telephone Laboratories, Incorporated, Murray Hill, N.J.

[22] Filed: Mar. 11, 1969

[21] Appl. No.: 806,136

[52] U.S. Cl. ............................................ 178/6.5, 350/3.5
[51] Int. Cl. ................................................... H04n 9/56
[58] Field of Search ..................... 350/3.5; 178/6.5; 340/56

[56] References Cited

UNITED STATES PATENTS

| | | | |
|---|---|---|---|
| 3,541,238 | 11/1970 | Enloe | 178/6.5 |
| 3,532,426 | 10/1970 | Lemmond | 350/3.5 |
| 3,511,552 | 5/1970 | Osterberg | 350/3.5 |

OTHER PUBLICATIONS

Three Dimensional Holography with Lensless Fourier- Transform Holograms and Course P/N Polaroid Film. Stroke, Brumm, Funkhouser– Jour. of Optical Society of Amer. Vol. 55, No. 10, pp. 1327– 1328 Oct. 1965.
Stroke– Spectroscopic Implications of New Holographic Imaging Methods– Physica Vol. 33 No. 1 pp. 253– 267.

Primary Examiner—Robert L. Richardson
Assistant Examiner—Joseph A. Orsino, Jr.
Attorney—R. J. Guenther and E. W. Adams, Jr.

[57] ABSTRACT

This disclosure relates to a holographic flying-spot scanner wherein a stationary collimated beam illuminates the subject and is then optically relayed via a beamsplitter to a photodetector. A scanning spot is focused an appropriate distance in front of the beamsplitter such that the locus of the virtual image thereof lies in a plane which is in front of, at, or behind, the subject or subject plane, as desired. The detected interference between the rays of the scanning spot and the beam passing through the subject is used to reconstruct a hologram of the subject. The plane of the hologram is the locus of the virtual image of the scanning spot.

10 Claims, 4 Drawing Figures

INVENTORS L. H. ENLOE
A. B. LARSEN
BY John K. Mullarney
ATTORNEY

HOLOGRAPHIC FLYING-SPOT SCANNER

BACKGROUND OF THE INVENTION

This invention relates to holography and, more particularly, to a holographic flying-spot scanner for use in hologram transmission systems.

Hologram transmission over an electrical channel is of interest not only because of the obvious desirability of being able to transmit three-dimensional images but also because of the possible use of some type of hologram transmission to provide a new error-resistant coding technique for the transmission of two-dimensional information.

Several techniques have been proposed, for hologram transmission, which use a scanning coherent light beam to produce an electrical signal that corresponds to a scanned hologram. The hologram itself is not formed at the transmitting end of the system as a physical entity, rather a modulated electrical carrier frequency corresponding to the spatial carrier frequency of the hologram is generated by heterodyning. Such a technique is set forth in the article "Hologram Heterodyne Scanners" by L. H. Enloe, W. C. Jakes, and C. B. Rubinstein, Bell System Technical Journal, Vol. 47, No. 9, Nov. 1968, pages 1875–1882. Briefly, in accordance with this technique, heterodyning is accomplished by scanning a focused spot of coherent light over a photodetector that is positioned to receiver a portion of the coherent light which illuminates the subject or object. The time-varying interference between the constant amplitude scanning spot and the object beam causes fluctuations in the photodetector output which are transmitted, and, at the receiver, serve to intensity modulate a video display, e.g., a kinescope.

In the above arrangement, the hologram plane is, of course, at the photodetector surface and this presents certain operational limitations. For example, to produce an image hologram of a two-dimensional transparency, the plane of the hologram should preferably lie at the plane of the subject transparency. This "best position" of the hologram plane cannot be realized in the prior art hologram heterodyne scanners, such as exemplified by the above-cited article. Further, to produce nonpseudoscopic real images it is necessary, in accordance with the prior art teachings, to introduce additional photographic or electronic processing. In typical fashion, a reconstructed pseudoscopic real image is formed (e.g., by reversing or turning around the holographic plate) and it, in turn, serves as the object of another formation-reconstruction process whose end product is, of course, a nonpseudoscopic real image. At the least, such additional processing is a nuisance.

SUMMARY OF THE INVENTION

It is accordingly a primary object of the present invention to increase the versatility of hologram scanners.

A related object of the invention is to provide a hologram flying-spot scanner wherein the plane of the hologram can be readily located in front of, at, or behind, the subject or subject plane, as desired.

In accordance with the present invention, these and other objects are realized in a holographic flying-spot scanner wherein the subject is actually illuminated only by a stationary coherent beam, while the virtual image of a focused spot scans in a plane which lies at a preselected relative position with respect to the subject. That is, the locus of the virtual image of the scanning spot can be in front of, at, or behind, the subject or subject plane, as desired. This virtual image scanning is accomplished by scanning a focused spot of coherent light an appropriate distance in front of a beam splitter which is disposed so as to optically relay, through transmission or reflection, the subject-illuminating beam toward a photodetector. The photodetector output is provided by the time-varying spatially integrated interference between the scanning reference beam and the stationary subject-illuminating beam. The plane of the resulting hologram is the locus of the virtual image of the scanning spot. Accordingly, the reconstructed image will appear behind, at, or in front of, the hologram plane depending upon the locus of said virtual image.

A particular feature of the present invention is the facility with which the plane of the hologram can be effectively placed at the plane of an object transparency so as to generate an image hologram. The same is readily accomplished, in accordance with the invention, by simply bringing the locus of the virtual image into register with the transparency.

In accordance with another feature of the invention the locus of the virtual image of the scanning spot can be readily positioned to lie behind the subject. The real image reconstruction obtained from a transmitted hologram of a three-dimensional subject made under these conditions will be nonpseudoscopic.

A particularly advantageous feature of the present invention lies in its obvious applicability to prior art flying-spot scanner arrangements where the subject under investigation may be damaged by the high field intensity of the typical focused scanning spot.

In accordance with a still further feature of the invention a real-time directly viewable image can be derived from holographic information without actually forming a hologram and going through the conventional reconstruction process using coherent light.

BRIEF DESCRIPTION OF THE DRAWINGS

A complete understanding of the present invention and of the above and other objects and features thereof can be gained from a consideration of the following detailed description when the same is read in conjunction with the accompanying drawings in which.

DETAILED DESCRIPTION

Figure 1:
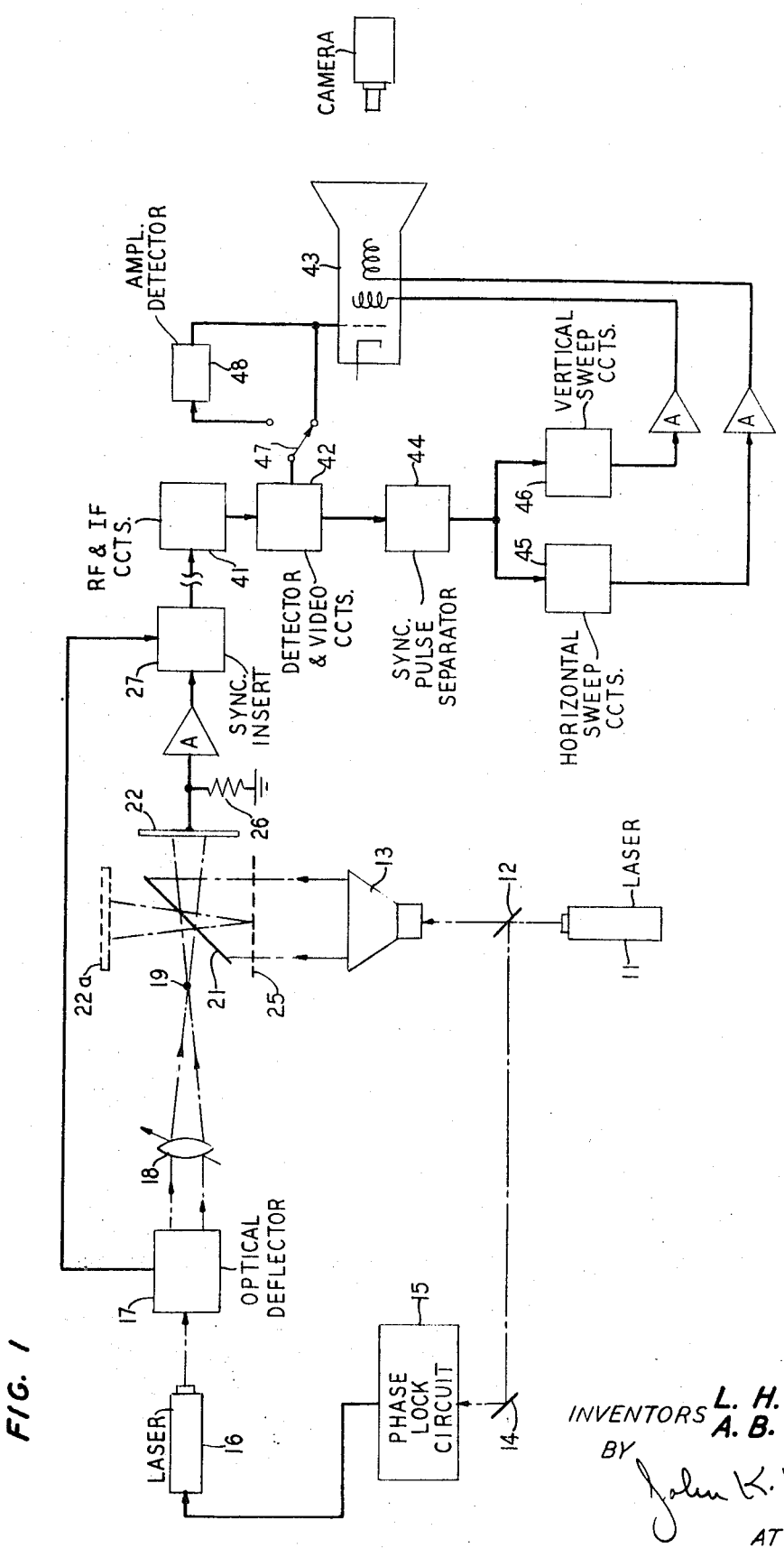
FIG. 1 illustrates a simplified schematic diagram of a hologram transmission system embodying the principles of the present invention.

Referring now to the drawings, FIG. 1 shows in simplified schematic form (1) transmitting apparatus for generating an alternating current signal that is modulated in phase and amplitude in accordance with the holographic information related to the subject or object and, (2) a typical receiver useful in the hologram reconstruction process. The transmitting apparatus comprises a source of monochromatic coherent light 11 such as a laser, a partially reflecting mirror 12 and an optical lens package 13. The mirror 12 is designed to transmit most of the impinging coherent light, while reflecting a small sample to mirror 14. Since the light beam from the laser is dimensionally small (e.g., a diameter of approximately 2 millimeters) a series of lenses (i.e., lens package 13) is utilized to insure that the entire subject under investigation is illuminated by the coherent light from source 11. The subject-illuminating beam is stationary.

The beam reflected from mirror 14 is delivered to the phase lock circuit 15 which, as the name implies, serves to lock the phase of laser source 16 to that of laser source 11. As is known to those in the art, lasers tend to run somewhat erratically, e.g., ±20 megacycles about their nominal frequency. For certain holography purposes, such as the present, such erratic behavior may result in an undesirable, nonuniform diffraction grating and hence various techniques have been proposed heretofore to circumvent or correct for the same. To "phase-lock" the frequency of the coherent light of laser source 16 to the frequency of laser source 11 is a known technique and the same can be readily utilized herein. Specifically, a phase lock circuit arrangement such as that disclosed in the copending application of Enloe-Jakes-Rubinstein, Ser. No. 779,844, filed Nov. 29, 1968, now U.S. Pat. No. 3,541,238 can be advantageously used for this purpose.

For simplicity in presentation, separate and distinct laser sources 11 and 16 have been shown in FIG. 1. However, as will be appreciated by those in the art, the two beams of coherent light can also be readily derived from a single laser source operated in double mode ($\omega_1, \omega_2$) fashion. Alternatively, the generation of different, phase-locked optical frequencies for the object-illuminating and reference beams can be arrived at by the doppler technique described in the copending application of A. B. Larsen, Ser. No. 845,230, filed July 28, 1969.

Accordingly, the present invention should in no way be construed as limited to any particular method or arrangement for deriving the illumination and reference beams and any of the techniques known in the art can be equally utilized to advantage herein.

The reference beam of coherent light from source 16 is deflected in a typical television type raster scan by the optical deflector 17 and it is then focused by a lens system, illustrated by lens 18, to form a scanning spot 19 an appropriate distance in front of the beam splitter 21. The raster scan of the focused spot can be carried out mechanically with rotating optical mirrors, by various electro-optical arrangements known in the art, or by the known acousto-optical deflection arrangement which operates on the principle of Bragg diffraction. Here again, the present invention is in no way limited to any particular optical deflector apparatus and any of the above-mentioned types can be advantageously utilized. The raster scan can be a conventional sequential line-by-line scan or, alternatively, it may be an interlaced scan.

As will be evident hereinafter, the locus of the focused spot 19 will be determined by the intended mode of operation, i.e., the desired relative position of the virtual image with respect to the subject. Accordingly, some provision must be made to provide for the axial or longitudinal movement of focal point 19. This is most readily achieved by means of a variable focal length lens system 18.

The waist of the reference beam (i.e., scan spot diameter) must be sufficiently small so as to resolve the highest spatial frequency of the subject beam. With the subject illuminating beam at 6,328A., for example, the waist can be of the order of 10 microns or less.

The beam splitter 21 serves to optically relay, by reflection in this case, the object illuminating beam toward the photodetector 22. The beam splitter 21 is conventional, and the photodetector 22 may comprise the plate of a conventional photomultiplier tube, a photodetector diode or any other device known in the art which takes impinging light rays and converts the same to electrical signal current, or voltage. As disclosed in the copending application of A. B. Larsen, cited above, detection is essentially independent of the longitudinal position of the photodetector.

As will be appreciated by those in the art, the photodetector 22 can just as readily be positioned at the location indicated by the dotted outline 22a. In practice, a pair of photodetectors are preferably positioned at locations 22 and 22a and are interconnected in a balanced detector configuration such as shown in the copending Larsen application, supra. In any case, the mode of operation, in accordance with the present invention, is exactly the same as that described herein.

With the scanned reference beam focused to define a spot at some given distance in front of the beam splitter, the locus of the virtual image of the scanned spot will lie in a plane 25 which is an equivalent distance from the beam splitter. This will be obvious. And as the locus of the focused spot 19 is shifted toward or away from the beam splitter by means of the variable focal length lens system, the virtual image thereof will be shifted a corresponding amount. As will be covered in detail hereinafter, the subject can be placed in front of, at, or behind, the plane 25. Alternatively, however, the subject can simply be placed at some inexact location in the path of the stationary beam, traveling from laser 11 toward beam splitter 21, and the locus of the virtual image is brought to the desired position with respect thereto.

The rays of the scanning spot and of the stationary beam that illuminates the subject interfere constructively and destructively with each other (i.e., they "heterodyne") at the photodetector and a corresponding current will be developed across the output resistance 26, which current will comprise a carrier that is modulated in phase and amplitude in accordance with the interference or holographic pattern generated by the interfering beams of light.

The signal across resistance 26 is amplified and delivered to the sync insert circuit 27 which, as the name implies, serves to insert the appropriate synchronization pulses into the output signal. These sync pulses can be derived from the deflector apparatus 17. In the above-cited Enloe et al., application, the necessary sync pulses are derived directly from the scan of the reference beam and this approach can be utilized.

The composite output signal, from sync insert 27, is transmitted to remote receiver apparatus via a transmission facility such as a coaxial cable or a radio relay system. The receiver apparatus in general comprises no part of the present invention and hence the same is shown and described only in brief detail herein. Typical receiver apparatus is shown in FIG. 1 to comprise input R.F. and I.F. circuits 41, detector and video circuits 42, kinescope 43, a pulse sync separator 44 which serves to separate the horizontal and vertical sync pulses from the video and from each other (relying on their respective time durations), and horizontal and vertical deflection sweep circuits 45 and 46, respectively. The video is normally coupled directly to the grid of the kinescope 43 via switch 47, the purpose of the latter will be evident hereinafter. The grid serves to modulate the electron beam, of the kinescope, in intensity in accordance with the received video, i.e., the holographic information signals. The horizontal and vertical sync pulses, in the received composite signal, are coupled to the deflection sweep circuits 45 and 46, respectively, and the latter in response thereto serve to deliver appropriate sweep signals to their respective deflection coils so as to generate a raster scan which corresponds to the scan of the reference beam at the transmitter. The hologram pattern thus displayed on the screen of the kinescope is then photographed and the resulting transparency used for holographic reconstruction, in the manner to be described in detail hereinafter. The circuitry associated with the kinescope display is conventional to television systems and has been extensively described in the literature; see, for example, "Television Standards and Practice," edited by D. M. Fink, McGraw-Hill Book Co., Inc. (1943) and "Electronic and Radio Engineering" by F. E. Terman, McGraw-Hill Book Co., Inc. (1955), Fourth Edition, page 991 et seq.

The kinescope-camera display arrangement is disclosed herein primarily for purposes of illustrating the present invention. In practice, a thermoplastic tape recorder, such as that disclosed in detail in the above-cited Enloe et al., application, or the well known "Swiss Eidophor" display system may prove more advantageous for normal display purposes.

Figure 2:
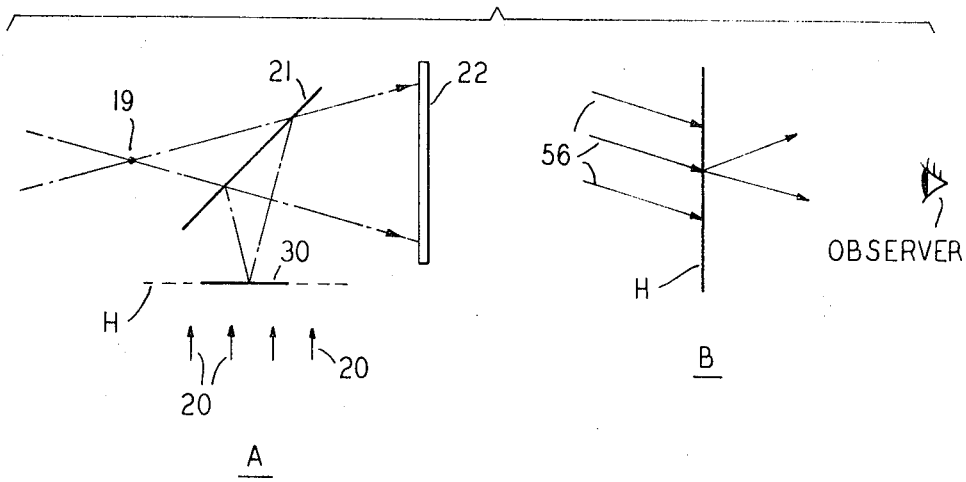
FIGS. 2 through 4 illustrate the several types of reconstructions that can be obtained with different relative positions of the subject and scan planes.
Figure 3:
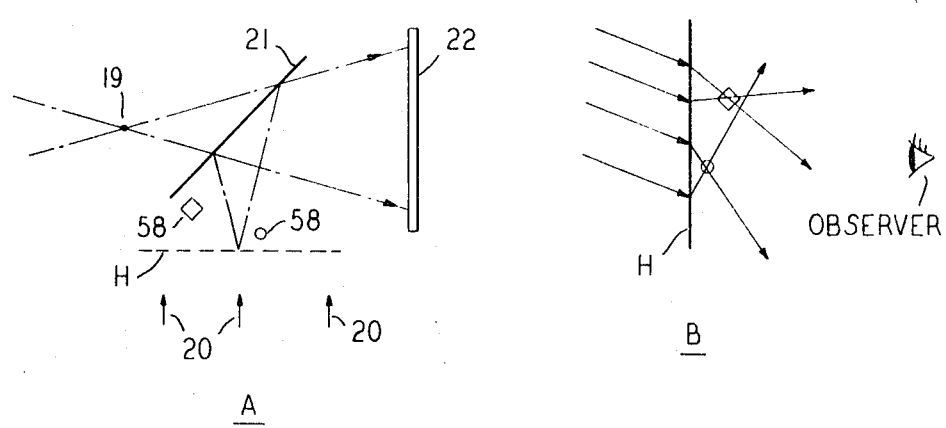
Figure 4:
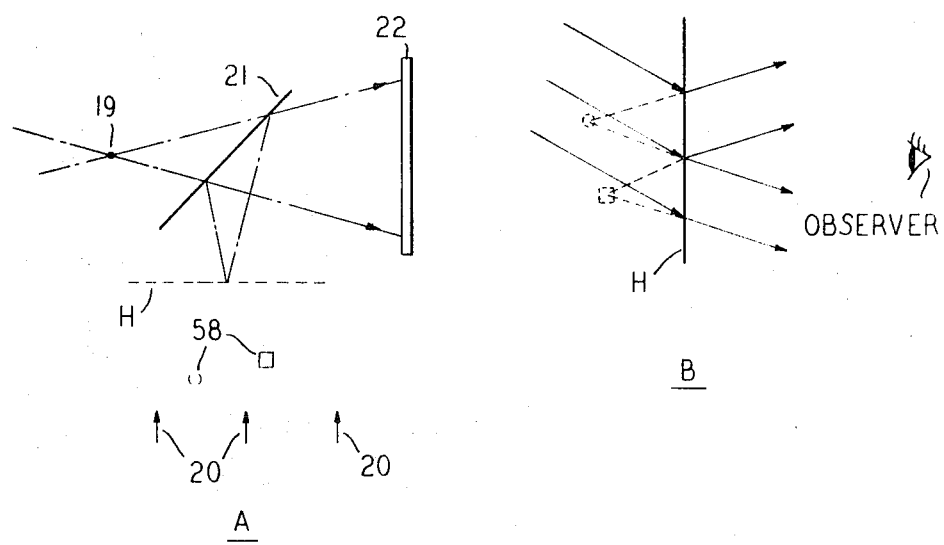

Turning now to FIGS. 2 through 4, several types of holographic reconstructions can be obtained in accordance with the invention with different relative positions of the object and scan planes. FIGS. 2A and 2B illustrate, respectively, the scanning and reconstruction for the case where these planes are in apparent register. As shown in FIG. 2A, the locus of the scanning beam waist (i.e., focused spot 19) occurs before the scanning reference beam encounters the beam splitter 21. Thus, at the scanning beam waist, there is, of course, no interference actually taking place. However, as to the light rays or waves as seen by the detector 22, it is not possible to tell whether the scanning reference beam originates as shown in FIG. 2A or whether it is coming along the same path as the object illuminating beam 20. This is because it is not possible to tell whether any given ray was transmitted through or reflected by the beam splitter. Thus, an object, such as object transparency 30, can be positioned such that it appears to be in the same plane as the scanning spot 19. In point of fact, it is the locus of the virtual image of the scanning spot that is in register with the plane of the object transparency 30.

The photodetector output is provided by the time-varying spatially integrated interference between the scanning reference beam and the stationary beam transmitted by the object. This spatially integrated interference information is equivalent to the interference pattern that appears to exist at the locus of the virtual image of the scanning spot. Stated somewhat differently, the plane of the resulting hologram is that plane at which a spatial interference appears to take place between the virtual image of the scanned spot and the object illuminating beam. The locus of the virtual image of the scanning spot thus defines the plane of the hologram.

In FIG. 2A, the hologram plane H (i.e., the locus of the virtual image of the scanning spot) is in register with the object transparency 30. The resulting image hologram that is displayed on the kinescope, in the manner heretofore described, is then photographed and the transparency used in the reconstruction process. This reconstruction is conventional and is briefly illustrated in FIG. 2B. In typical fashion, the holographic transparency is illuminated with a coherent light beam 56 from a source (not shown) corresponding to the reference beam source 16. The reconstructed image, in this case, is observed to lie at the plane of the hologram.

As was explained hereinbefore, the locus of the virtual image of the scanning spot can be effectively moved toward or away from the beam splitter 21 by means of the variable focal length lens system 18. Thus, the plane of the hologram can be placed in front of, at, or behind the subject, as desired. To generate an image hologram of a two-dimensional transparency the hologram plane H is preferably placed in registry with the transparency. This is the situation illustrated in FIG. 2.

In FIG. 3A, the locus of the virtual image of the scanning spot is disposed behind the objects 58; the objects, therefore, lie in front of the hologram plane H. The real image reconstruction obtained from a transmitted hologram of a three-dimensional object scene made under these conditions will be nonpseudoscopic. This is illustrated in FIG. 3B where the resultant holographic transparency, when illuminated by coherent light, serves to generate orthoscopic real images of the original objects.

In FIG. 4A, the locus of the virtual image of the scan spot is disposed in front of objects 58. As shown in FIG. 4B, reconstruction in this case yields a conventional virtual image. Now while the end result here is the same as that offered by prior art arrangements, operation in the virtual image mode, in accordance with the invention, permits a closer approach of the subject to the hologram plane. In fact, any desired proximate position of the subject to the hologram plane can be achieved.

In common with the signals obtained for other types of holograms, the signals generated for the transmission of image holograms contain information concerning both the amplitude and phase of the wave front to be reconstructed. Now it has been found that if only a two-dimensional reconstruction is desired, the phase information is not needed. And elimination of this phase information produces a conventional amplitude-only display, which can be presented and directly viewed on the kinescope 43. This phase elimination is carried out by passing the amplitude and phase modulated holographic signal through an envelope or amplitude detector 48 before displaying it. Thus, when it is desired to convert holographic information into two-dimensional images without actually forming a hologram and going through a reconstruction process using coherent light, the switch 47 is actuated to connect the detector 48 between the video circuitry 42 and the grid of the kinescope. This provides a directly viewable image from information obtained holographically, which is of obvious value where an instantaneous display of holographically derived information is desired without resort to the much more elaborate real-time holographic display arrangements. All three-dimensional effects are, however, lost. The displays obtained using this direct display technique have been found to be subjectively superior to those obtained from conventional holographic reconstructions.

The same effect can be achieved without any additional circuitry, such as detector 48, by biasing the display kinescope to cutoff with no signal present, i.e., when the object is opaque and no fringe pattern is being generated by the scanning reference beam. Then, the greater the transmission of the object, the greater the amplitude of the photodetector AC signal output and the brighter the kinescope on the positive peaks of the input signal. The kinescope itself is thus used as a half-wave envelope detector.

When utilizing the direct image display technique, the displayed image degrades rapidly as the object and hologram planes separate. This, plus the fact that all three-dimensional effects are lost, makes the direct display feature of interest primarily to the image hologram case (i.e., FIG. 2).

One of the uses proposed for holographic scanners is in a real time three-dimensional television system. In such a system the subject scene is successively and continuously scanned in raster fashion and at the receiver the holographic information is displayed a frame at a time. Such a system is disclosed in the above-cited Enloe et al. application. Similar proposals have been made by others. It will be apparent, therefore, that while the present invention has not been disclosed in such a system environment, it has direct applicability thereto and a real time three-dimensional television system incorporating the principles of the present invention is within the skill of those in the art. Accordingly, it is to be understood that the above-described embodiments are merely illustrative of the invention and that numerous modifications or alterations may be made therein without departing from the spirit and scope of the present invention.

What is claimed is:

1. A holographic flying spot scanner comprising means for generating a stationary coherent light beam, a beam splitter, a subject disposed in the path of the coherent light beam at a position intermediate the generating means and the beam splitter, a photodetector, said beam splitter serving to optically relay the subject illuminating coherent light beam to said photodetector, means for providing a reference beam of coherent light orthogonally disposed with respect to said stationary beam, means for focusing said reference beam to a spot a given distance in front of said beam splitter, the coherent light of the focused spot also being optically relayed by said beam splitter to said photodetector, said photodetector being disposed at an out-of-focus location with respect to the focused spot, and means for raster scanning said focused spot in front of said beam splitter so that said subject is effectively scanned by the virtual image of the scanning spot, the plane of the resultant holographic interference being determined by the different loci of said virtual image.

2. A holographic scanner as defined in claim 1 wherein the locus of the virtual image of the scanning spot lies a predetermined distance behind the subject.

3. A holographic scanner as defined in claim 1 wherein the locus of the virtual image of the scanning spot lies a predetermined distance in front of the subject.

4. A holographic scanner as defined in claim 1 wherein the locus of the virtual image of the scanning spot is in register with the subject.

5. A holographic scanner as defined in claim 1 wherein said subject is a two-dimensional transparency and the locus of the virtual image of the scanning spot lies in the plane of the transparency.

6. In combination with the holographic scanner as defined in claim 5, a kinescope display means, means for delivering the holographic information output signal of the photodetector to said kinescope display means to provide a video display of said holographic information, and means included in said kinescope display means for eliminating the phase information from said holographic signal to provide a direct amplitude-only video display.

7. A holographic scanner as defined in claim 1 including focus control means for controlling the distance in front of the beam splitter at which said focused spot is caused to scan.

8. A holographic flying spot scanner comprising means for illuminating a subject with a stationary coherent light beam, a beam splitter positioned in the path of the subject illuminated coherent light beam and serving to optically relay the latter by through transmission and reflection, a photodetector positioned to receive the optically relayed beam, means for providing a reference beam of coherent light which is orthogonally disposed with respect to said stationary beam, means for focusing said reference beam to define a spot a given distance in front of said beam splitter, the coherent light of the focused spot also being optically relayed by said beam splitter to said photodetector, said photodetector being disposed at an out-of-focus location with respect to the focused spot, and means for raster scanning said focused spot in front of said beam splitter such that the locus of the virtual image thereof lies in a plane having a predetermined relative position with respect to said subject in accordance with the relative distances of the focused spot and the subject to the beam splitter, the different loci of the virtual image of the scanning spot determining the plane of the resultant holographic interference.

9. A holographic scanner as defined in claim 8 including focus control means for varying the distance between said focused spot and said beam splitter, whereby the locus of the virtual image of the scanning spot can be disposed in front of, at, or behind the subject.

10. In combination with the holographic scanner as defined in claim 9, a kinescope display means, means for delivering the holographic information output signal of the photodetector to said kinescope display means to provide a video display of said holographic information, and means included in said kinescope display means for providing a directly viewable video image from an image hologram signal derived from the holographic scanner.

* * * * *